(12) United States Patent
Guo et al.

(10) Patent No.: US 12,082,582 B2
(45) Date of Patent: *Sep. 10, 2024

(54) SYNERGISTIC PRESERVATIVE COMPOSITIONS, PROCESS FOR PREPARING THE SAME AND METHOD OF USE THEREOF

(71) Applicant: ISP INVESTMENTS LLC, Wilmington, DE (US)

(72) Inventors: Meiyan Guo, Shanghai (CN); Karen Winkowski, Springfield, NJ (US); Najeeb H. Hakimi, Edison, NJ (US); Raman Premachandran, White Plains, NY (US); Xin Qu, Shanghai (CN)

(73) Assignee: ISP INVESTMENTS LLC, Wilmington, DE (US)

(*) Notice: Subject to any disclaimer, the term of this patent is extended or adjusted under 35 U.S.C. 154(b) by 387 days.

This patent is subject to a terminal disclaimer.

(21) Appl. No.: 17/297,628

(22) PCT Filed: Dec. 2, 2019

(86) PCT No.: PCT/US2019/063979
§ 371 (c)(1),
(2) Date: May 27, 2021

(87) PCT Pub. No.: WO2020/113211
PCT Pub. Date: Jun. 4, 2020

(65) Prior Publication Data
US 2022/0030862 A1    Feb. 3, 2022

Related U.S. Application Data

(60) Provisional application No. 62/773,939, filed on Nov. 30, 2018.

(51) Int. Cl.
*A01N 43/28* (2006.01)
*A01N 31/02* (2006.01)
*A01N 31/14* (2006.01)
*A01N 37/28* (2006.01)

(52) U.S. Cl.
CPC ............ *A01N 43/28* (2013.01); *A01N 31/02* (2013.01); *A01N 31/14* (2013.01); *A01N 37/28* (2013.01)

(58) Field of Classification Search
CPC ..................................................... A01N 43/28
See application file for complete search history.

(56) References Cited

U.S. PATENT DOCUMENTS

| 2015/0118165 A1 | 4/2015 | Rudolph et al. |
| 2016/0015031 A1 | 1/2016 | Pesaro et al. |
| 2018/0092357 A1 | 4/2018 | Premachandran et al. |

FOREIGN PATENT DOCUMENTS

WO    WO-2016164555 A1 * 10/2016  ............. A01N 25/22

* cited by examiner

*Primary Examiner* — Benjamin J Packard
(74) *Attorney, Agent, or Firm* — William J. Davis; Nathalie Tietcheu

(57) ABSTRACT

Described herein is a synergistic preservative composition used for providing broad spectrum antimicrobial activity comprising: (i) about 0.1 wt. % to about 99.9 wt. % of propylene carbonate; (ii) about 0.1 wt. % to about 99.9 wt. % of one or more organic compounds selected from the group consisting of propanediol, capryl hydroxamic acid, and isopropyl methyl phenol; and (iii) about 0.1 wt. % to 99.0 wt. % of phenoxyethanol, a preservative compound, and wherein, the composition provides synergy having Synergy Index (SI) value of the total composition from about 0.05 to about 1.0. Also described is a process for preparing said synergistic preservative composition and method of using the same.

15 Claims, No Drawings

SYNERGISTIC PRESERVATIVE COMPOSITIONS, PROCESS FOR PREPARING THE SAME AND METHOD OF USE THEREOF

FIELD OF THE INVENTION

The present application relates to synergistic preservative composition(s), and more particularly, to synergistic preservative composition(s) that can provide broad spectrum antimicrobial activity comprising propylene carbonate, one or more organic compound(s), and at least one preservative compound.

BACKGROUND OF THE INVENTION

The preservatives or preservative systems are employed in various non-limiting industrial applications including personal care, household, coatings, metalworking fluids, paper, wood, plastics, disinfection, cosmetics, toiletry, pharmaceuticals, food, beverages, oral care, paints, or water treatment to overcome the problems of mildew, mold, fungi and bacterial based microbial contamination.

Particularly, the personal care, pharmaceuticals, food, beverages, nutrition care products fragrance products, cosmeceuticals, nutraceuticals, cosmetics, treatment, skin care and anti-aging products usually incorporate ingredients that support microbial growth and proliferation, and therefore, these products engage significant amounts of preservatives as they directly affect the consumers. Additionally, regardless of their use, these products in general include an aqueous medium as one important component. This aqueous phase facilitates a medium in which microorganisms can survive and/or proliferate. Thus, these products by their very nature create an environment and viable medium for the proliferation of microbial organisms. Without the addition of some preservative agent, these types of products are susceptible to microbial contamination and proliferation.

Accordingly, a preservative can be added to such products at the time of manufacturing to protect the product against microbial contamination in the long term. The choice of type and level of the preservative is typically made by the formulator based upon several factors including, for example, the microbiological requirements of the product, cost, the pH of the product, compatibility with the other formulation ingredients and regulatory restrictions. A guide to the factors used in preservative selection and testing can be found in "Cosmetic and Drug Preservation, Vol. I, Principles and Practice", published by Marcel Dekker Inc.

Further, according to current regulatory guidelines, the permitted use levels of conventional, traditional and progressive preservatives are not capable of preserving end-user products. However, such preservatives can preserve the end-user products by inhibiting or killing the microbial strains at higher concentrations levels than recommended limits. Therefore, there is an absolute need to find a solution to make or empower such preexisting conventional, traditional and progressive preservatives that can kill or inhibit microbial strains within permitted use levels.

Although some of these progressive preservatives are green, they tend to have inherent properties of not partitioning into the water phase to enhance preservative activity. Instead they connect or mix with the oil phase of the end-user products to modify their rheological properties in a negative way.

Accordingly, it is a primary objective of the present application to find a solution to increase efficacy of conventional and progressive preservatives and thereby reduced or lower concentrations of such preservatives that can kill or inhibit the microbial strains. Accordingly, the lower concentrations of preservatives lead to reduced cost and minimized toxicity.

Another objective of the present application is to provide an efficacious preservative or preservative system that is compatible with end-user products and does not affect its physical and rheological properties during incorporation of said preservative or preservative system into such end-user products.

Yet another objective of the present application is to provide an efficacious preservative or preservative system that can offer broad spectrum efficacy against gram (+), gram (−) bacteria, mold and yeast.

One other objective of the present application is to provide a solution to enhance the partitioning of poorly water soluble green progressive preservatives into the water phase when added to end-user products which comprise mixtures of oil and water-based ingredients.

US Publication No. 20160015031A1 assigned to Symrise discloses an antimicrobial composition comprising (a) at least one acetophenone derivative of formula (I) in which $R_1$ stands for hydrogen or methyl, and $R_2$ stands for hydrogen, hydroxyl or a —$OCH_3$ group, or a cosmetically or pharmaceutically acceptable salt thereof, and (b) at least one second antimicrobial agent.

(I)

U.S. Publication No. 20160100574 assigned to Symrise discloses an antimicrobial agent comprising at least one glycerylether of formula (I) in which $R_1$ represents a benzyl, methylbenzyl, phenylethyl, or phenylpropyl radical, or a glycerylether of formula (II) in which $R_2$ stands for a linear or branched alkyl radical having 2 to 12 carbon atoms, on condition that in case of glyceryl ethers of formula (II) two or three of said species are present.

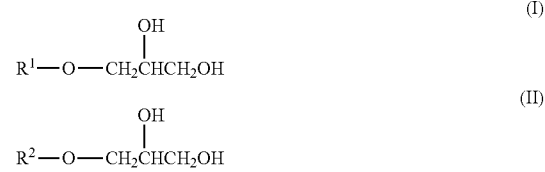

PCT application No. 2016164555 assigned to ISP Investments Inc. discloses a synergistic preservative composition capable of providing broad spectrum antimicrobial activity comprising: (i) about 0.1 wt. % to about 99.9 wt. % of propylene carbonate; (ii) about 0.1 wt. % to about 99.9 wt. % of one or more organic compounds, and wherein, inclusion of each additional organic compound is capable of demonstrating synergistic effect; and (iii) optionally, about 0.1 wt. % to 99.0 wt. % of one or more preservative compounds, and wherein, inclusion of each preservative compound is capable of demonstrating synergistic effect, wherein the Synergy Index (SI) value of the total composition is from about 0.05 to about 1.0.

U.S. Pat. No. 9,782,609 assigned to Dow Global Technologies discloses a synergistic microbicidal composition consisting of: (a) thymol; and (b) (−)-carveol; and (c) a carrier; wherein the weight ratio of thymol to (−)-carveol is from 1:0.19 to 1:4.38; and in which the carrier is selected from the group consisting of water, propylene glycol, diethylene glycol, dipropylene glycol, polyethylene glycol, polypropylene glycol, ethanol, isopropanol and mixtures thereof.

SUMMARY OF THE INVENTION

One objective of the present application is to provide a synergistic preservative composition for providing broad spectrum antimicrobial activity comprising: (i) about 0.1 wt. % to about 99.9 wt. % of propylene carbonate (PC); (ii) about 0.1 wt. % to about 99.9 wt. % of one or more organic compounds selected from the group consisting of propanediol (PD), caprylhydroxamic acid (CHA), and isopropyl methylphenol (IPMP); and (iii) about 0.1 wt. % to 99.0 wt. % of phenoxyethanol, a preservative compound, and wherein, the inclusion of each additional preservative compound can demonstrate synergistic effect.

Another aspect of the present application provides synergistic preservative compositions used for inhibiting or killing microbial strains selected from the group consisting of *Candida tropicalis, Candida albicans, Hansenula anomala, Saccharomyces cerevisiae, Torulaspora delbreuckii, Zygosaccharomyces bailii, Zygosaccharomyces rouxii, Bacillus subtilis, Bacillus cereus, Staphylococcus aureus, Staphylococus epidermidis, Escherichia coli, Salmonella typhimurium, Salmonella enteritidis, Pseudomonas aeruginosa, Aspergillus niger, Aspergillus flavus, Penicillium islandicum, Penicillium citrinum, Penicillium chrysogenum, Fusarium oxysporum, Fusarium graminearum, Fusarium solani, Alternaria alternata, Aspergillus brasiliensis, Burkhodelia cepacia, Enterobacter aerogenes, Enterobacter cloacae, Enterobacter gergoviae, Klebsiella pneumoniae, Proteus vulgaris, Pseudomonas fluorescens, Pseudomonas putida, Penicillium pinophilum* and *Mucor racemosus.*

One other aspect of the present application provides synergistic preservative compositions that can be employed in various aqueous and non-aqueous based end-user applications comprising cosmetic products, toiletry products, personal care products, oral care products, skin care products, hair care products, household & cleaning products, industrial and institutional cleaning products, disinfecting products, contact lens, enzyme based formulations, wound care, sanitary products, agricultural compositions, textile industries, coating industries and/or laundry products. The preservative composition can be formulated as emulsion, microemulsion, nano-emulsion, solution, dispersion, suspension, complex coacervate(s), lamellar gel system, liposome or niosome based formulations or concentrates.

Another aspect of the present application provides a process for preparing the above-described synergistic preservative, said process comprising mixing (i) about 0.1 wt. % to about 99.9 wt. % of propylene carbonate; (ii) about 0.1 wt. % to about 99.9 wt. % of one or more organic compounds selected from the group consisting of diols, $C_1$-$C_{20}$ alkane diols, organic acids and their sodium/potassium salts, $C_1$-$C_{20}$ fatty acids and their sodium/potassium salts, esters of organic acids, esters of $C_1$-$C_{20}$ fatty acids, phenolic compounds, terpenes, amino acids, natural preservatives, herbal preservatives, and oils derived from natural products; and (iii) about 0.1 wt. % to 99.0 wt. % of one or more preservatives to provide a homogenous solution.

According to yet another aspect of the present application, a method is provided to kill or inhibit bacteria, fungi, molds, yeasts and viruses or inhibiting their growth in a cosmetic, personal care, house hold, cleaning, and/or Industrial & Institutional products susceptible to growth of microorganisms comprising incorporating into such product about 0.01 wt. % to 5.0 wt. % of said synergistic preservative composition.

DETAILED DESCRIPTION OF THE INVENTION

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

While this specification concludes with claims particularly pointing out and distinctly claiming that which is regarded as the invention, it is anticipated that the invention can be more readily understood through reading the following detailed description of the invention and study of the included examples.

As utilized in accordance with the disclosure, the following terms, unless otherwise indicated, shall be understood to have the following meanings.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

All percentages, parts, proportions and ratios as used herein, are by weight of the total composition, unless otherwise specified. All such weights as they pertain to listed ingredients are based on the active level and, therefore; do not include solvents or by-products that may be included in commercially available materials, unless otherwise specified.

All publications, articles, papers, patents, patent publications, and other references cited herein are hereby incorporated herein in their entirety for all purposes to the extent consistent with the disclosure herein.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "comprising" thus encompasses and includes the more restrictive terms "consisting of" and "consisting essentially of" which can be used to characterize the essential ingredients such as propylene carbonates, aromatic/organic compounds, solvents and/or conventional preservatives that are described in the present application. Further, the singular forms "a," "an," and "the" include plural forms unless the context clearly dictates otherwise specified or clearly implied to the contrary by the context in which the reference is made.

The term "each independently selected from the group consisting of" means when a group appears more than once in a structure, that group may be selected independently each time it appears.

All publications, articles, papers, patents, patent publications, and other references cited herein are hereby incorporated herein in their entireties for all purposes to the extent consistent with the disclosure herein.

The term "preservative" or "antimicrobial" as used herein is to be understood to refer to agents such as bactericides, fungicides, algicides, aquaticides, herbicide, insecticide, pesticide, plant growth regulators and the like, which are used for their ability to inhibit growth of and/or kill biological and/or microbiological species such as bacteria, fungi, algae, caterpillar, insects, larvae, mildew, rodents, spider, worm and the like.

The term 'Preservation" refers to preventing or retarding deterioration due to microbial attack of any consumer product. A preservative is an active ingredient that hinders or kills the growth of bacterial and fungal strains that can be present in any consumer products, and chiefly water-based consumer products. Therefore, the preservative action of any consumer products is performed by employing a single preservative or mixture of preservatives to have broad spectrum antimicrobial activity.

The term "Broad Spectrum" as described herein means that the preservative compositions of the present application can have the ability to inhibit or kill a wide range of microbial organisms which are responsible to decay or spoil any consumer products that are prone to microbial attack.

The term "additive effect" or "additive synergism" refers to the combined effect produced by the action of two or more compounds or two or more organic compounds having less preservative ability being equal to the sum of their separate effects of organic compounds or preservative compounds. The term "cumulative effect" or "cumulative synergism" refers to serial addition of the organic and/or preservative compounds that results in a synergistic effect which is several times greater than sum of their individual effects or additive effects.

As used herein, "stable" and "stability" mean a composition which is significantly unaffected in chemical nature, physical homogeneity and/or color upon exposure to conditions reasonably expected to be incurred in transport, storage and their use in end-user applications. Stability may be determined either by empirical observation or by suitable methods of chemical and/or physical examination that would be known to one skilled in the art.

What is described herein is a synergistic preservative composition which can provide broad spectrum antimicrobial activity comprising: (i) about 0.1 wt. % to about 99.9 wt. % of propylene carbonate; (ii) about 0.1 wt. % to about 99.9 wt. % of one or more organic compounds selected from the group consisting of propanediol, capryl hydroxamic acid, and isopropyl methyl phenol; and (iii) about 0.1 wt. % to 99.0 wt. % of phenoxyethanol, a preservative compound, wherein, the composition provide synergy having Synergy Index (SI) value of the total composition is from about 0.05 to about 1.0 and wherein, inclusion of each organic and/or preservative compound is used for demonstrating synergistic effect. The Synergy Index (SI) value of the total composition is from about 0.05 to about 1.0, and other ranges of Synergy Index would include, but are not limited to, about 0.05 to 0.1, about 0.1 to about 0.2, about 0.2 to 0.3, about 0.3 to 0.4, about 0.4 to 0.5, about 0.5 to 0.6, about 0.6 to 0.7, about 0.7 to 0.8, about 0.8 to 0.9, and about 0.9 to 0.95.

According to another aspect of the present application, the synergistic composition of the present application can provide additive and/or cumulative synergistic effect, wherein said synergy increases the efficacy of the total composition and reduces the required antimicrobial use levels of (i) one or more organic compounds and (ii) phenoxyethanol, a preservative compound.

According to another aspect of the present application, the inclusion of propylene carbonate to (i) one or more organic compound/s and (ii) phenoxyethanol, a preservative compound provides an effective composition that can demonstrate synergism. The use of propylene carbonate increases the efficacy of the synergistic composition and thereby further reduces the use levels of required organic compounds or preservative compounds. The reduction in required use level of one or more organic compounds/preservative compounds is extremely significant in nature.

According to another aspect of the present application, the synergistic composition of the present application can provide cumulative synergistic effect in addition to the additive synergistic effect, wherein said cumulative synergy increases the efficacy of the total composition and reduces the required approved antimicrobial use levels of (i) one or more organic compounds and (ii) phenoxyethanol, a preservative compound.

According to another aspect of the present application, the inclusion of propylene carbonate to (i) one or more organic compound/s and (ii) phenoxyethanol, a preservative compound provides an effective composition demonstrating cumulative synergism. The use of propylene carbonate increases the efficacy of the cumulative synergistic composition and thereby further reduces the use levels of required organic compounds or preservative compounds. The reduction in required use level of organic compounds/preservative compounds is extremely significant in nature.

The amount of propylene carbonate employed in the present application includes, but is not limited to, about 0.1 wt. % to about 10 wt. %, about 11 wt. % to about 20 wt. %, about 21 wt. % to about 30 wt. %, about 31 wt. % to about 40 wt. %, about 41 wt. % to about 50 wt. %, about 51 wt. % to about 60 wt. %, about 61 wt. % to about 70 wt. %, about 71 wt. % to about 80 wt. %, about 81 wt. % to about 90 wt. %, and about 91 wt. % to about 99.9 wt. %.

According to one embodiment of the present application, it is contemplated that the propylene carbonate is used for reducing yellowing effect of preservative compound or organic compounds that are susceptible to yellowing either alone or when added to end-user products.

According to another embodiment of the present application, the ratio of organic compounds and preservative compounds to propylene carbonate is optimized to provide antimicrobial action which is synergistically advantageous and aptly intensified. The ratio of propylene carbonate to organic/preservative compounds preferably is in the range of from about 1:10 to about 10:1.

In one embodiment of the application, the synergistic composition of propylene carbonate with one or more organic compounds or preservative compounds can provide broad spectrum antimicrobial properties. Propylene carbonate alone has no significant antimicrobial and antifungal characteristics (MIC). However, propylene carbonate boosts significantly both the antimicrobial and antifungal characteristics of known preservatives or boosters. The presence of propylene carbonate in the composition can maximize the partitioning of the mixture of organic/preservative compounds into the water phase when added to an end-user composition comprising a mixture of oil and a water phase. Further, the propylene carbonate-based compositions or blends acts as a delivery agent for other preservative/organic actives that have low polarity with high dielectric constant making it a suitable blend to dissolve hydrophobic non-polar actives. The high dielectric constant of the composition enables it to partition the active ingredients towards the oil/water interface which is critical for maximum efficacy and reduces use levels of preservatives or boosters.

One or more organic compounds for the purposes of present application is duly selected based on their ability to demonstrate synergistic effect when two or more organic compounds are combined, and wherein, the desired Synergy Index (SI) for selecting such two or more organic compounds falls in the range of from about 0.05 to about 1.0 approximately. Other suitable SI ranges for selecting one or more organic compounds are from about 0.05 to about 0.95, and other ranges of Synergy Index would include, but are not limited to, about 0.05 to 0.1, about 0.1 to about 0.2, about 0.2 to 0.3, about 0.3 to 0.4, about 0.4 to 0.5, about 0.5 to 0.6, about 0.6 to 0.7, about 0.7 to 0.8, about 0.8 to 0.9, and about 0.9 to 0.95. The synergy test is performed with one individual microorganism and based on their efficacy, the components of the composition is selected to target bacterial or fungal strains of interest.

Similarly, one or more organic compounds for the present application is appropriately selected based on their ability to demonstrate synergy or effect when two or more preservative agents are combined, and wherein, the desired Synergy Index (SI) for selecting such preservative compounds falls in the range of from about 0.05 to about 1.0 approximately. Other suitable SI ranges for selecting preservative compound are from about 0.05 to about 1.0, and other ranges of Synergy Index would include, but are not limited to, about 0.05 to 0.1, about 0.1 to about 0.2, about 0.2 to 0.3, about 0.3 to 0.4, about 0.4 to 0.5, about 0.5 to 0.6, about 0.6 to 0.7, about 0.7 to 0.8, about 0.8 to 0.9, and about 0.9 to 0.95.

Another non-limiting embodiment of the present application provides a suitable organic compound for preparing the synergistic composition of the present application duly selected from the group consisting of, but not limited to, diols, C2-C20 alkane diols, organic acids and their sodium/potassium salts, C2-C20 fatty acids and their sodium/potassium salts, esters of organic acids, esters of C2-C20 fatty acids, amino acids, phenolic compounds, essential oils, natural preservatives, terpenes, and combinations thereof.

Other, non-limiting examples of the alkanediol compounds having —OH groups at adjacent or different positions include but are not limited to 1,2-propanediol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 1,10-decanediol, neopentyl glycol, isoprene glycol (3-methyl-1,3-butanediol), 1,2-hexanediol, 1,6-hexanediol, 3-methyl-1,5-pentanediol, 1,2-octanediol, 2,3-octanediol, 2-ethyl-1,3-hexanediol, 2-butyl-2-ethyl-1,3-propanediol, 2,5-dimethyl-2,5-hexanediol, 1,2-decanediol, 1,2-dodecanediol, 1,2-tetradecanediol, 1,2-hexadecanediol, 1,2-octadecanediol, 1,12-octadecanediol, 1,2-cyclohexanediol, 1,4-cyclohexanediol, and 1,4-cyclohexanedimethanol. The preferred diols for the present application is selected from the group consisting of 1,3-propanediol, 1,2-hexanediol, 1,2-octanediol, 1,2-decanediol and combinations thereof.

Suitable organic acids are selected from the group consisting of sugar acids, α-hydroxy carboxylic acids, β-hydroxy carboxylic acids, α-hydroxy organic acids and/or β-hydroxy organic acids. Non-limiting organic acid include benzoic acid, salicylic acid, benzoic acid, glycolic acid, succinic acid, lactic acid, malic acid, citric acid, octanoic acid, 2-hydroxyalkanoic acids, 2-hydroxyalkenoic acid, 2-hydroxy-n-butanoic acid, 2-hydroxy-n-hexanoic acid, 2-hydroxy-n-octanoic acid, 2-hydroxy-n-decanoic acid, 2-hydroxy-n-dodecanoic acid, 2-hydroxy-n-tetradecanoic acid, 2-hydroxy-n-hexadecanoic acid, 2-hydroxy-4-hexenoic acid, 2-hydroxy-4-octenoic acid, 2-hydroxy-4-decenoic acid, 2-hydroxy-4-dodecenoic acid, 2-hydroxy-4-tetradecenoic acid, 2-hydroxy-4-hexadecenoic acid, 2-hydroxy-4,7-octadienoic acid, 2-hydroxy-4,9-decadienoic acid, 2-hydroxy-4,10-undecadienoic acid, 2-hydroxy-4,11-dodecadienoic acid, 2-hydroxy-4,13-tetradecadienoic acid, 2-hydroxy-4,15-hexadecadienoic acid, 2-hydroxy-6-oxa-4-heptenoic acid, 2-hydroxy-7-oxa-4-octenoic acid, 2-hydroxy-9-oxa-4-decenoic acid, 2-hydroxy-9-oxa-4-undecenoic acid, 2-hydroxy-11-oxa-4-dodecenoic acid, 2-hydroxy-13-oxa-4-tetradecenoic acid, 2-hydroxy-13-oxa-4-pentadecenoic acid, 2-hydroxy-14-oxa-4-pentadecenoic acid, 2-hydroxy-13-oxa-14-methyl-4-pentadecenoic acid, 2-hydroxy-11-14-dioxa-4-pentadecenoic acid, 2-hydroxy-13-oxa-4-hexadecenoic acid, 2-hydroxy-14-oxa-4-hexadecenoic acid, 2-hydroxy-15-oxa-4-hexadecenoic acid and combinations thereof.

In another embodiment of the present application, the organic acid can be at least one saturated/unsaturated fatty acids, at least one saturated/unsaturated fatty acid esters, at least one C1-C20 alkyl/cycloalkyl substituted saturated/unsaturated fatty acids, at least one C1-C20 alkyl/cycloalkyl substituted saturated/unsaturated fatty acid esters, alone or in combination thereof, wherein the desired fatty acids and fatty acid esters will have carbon chain length of from about 2 to 20. In one embodiment, the non-limiting examples of saturated/unsaturated fatty acid and suitable natural or naturally derived fatty acids and their ester would comprise adipic, caprylic acid, capric acid, lauric acid, myristic acid, myristoleic acid, palmitic acid, palmitoleic acid, stearic acid, oleic acid, ricinoleic acid, linoleic acid, linolenic acid, eleostearic acid, arachidic acid, arachidonic acid, behenic acid, erucic acid, γ-linolenic acid, homo-γ-linolenic acid, columbinic acid, eicosa-(n-6,9,13)-trienoic acid, arachidonic acid, α-linolenic acid, timnodonic acid, hexaenoic acid, lignoceric acid, cerotic acid, sapienic acid, elaidic acid, vaccenic acid, linoelaidic acid, α-linolenic acid, eicosapentaenoic acid, docosahexaenoic acid, caprylhydroxamic acid alone or in combination thereof.

Other non-limiting examples of phenolic compounds include, but are not limited to, phenol, thymol, 4-isopropyl 3-methylphenol/biosol/p-thymol (known as IPMP), 2-methyl phenol, 3-methyl phenol, 4-methyl phenol, 4-ethyl phenol, 2,4-dimethyl phenol, 2,5-dimethyl phenol, 3,4-dimethyl phenol, 2,6-dimethyl phenol, 4-n-propyl phenol, 4-n-butyl phenol, 4-n-amyl phenol, 4-tert-amyl phenol, 4-n-hexyl phenol, 4-n-heptyl phenol, mono- and poly-alkyl and aromatic halophenols such as p-chlorophenol, methyl-p-chlorophenol, ethyl-p-chlorophenol, n-propyl-p-chlorophenol, n-butyl-p-chlorophenol, n-amyl-p-chlorophenol, sec-amyl-p-chlorophenol, n-hexyl p-chlorophenol, cyclohexyl-p-chlorophenol, n-heptyl-p-chlorophenol, n-octyl-p-chlorophenol, o-chlorophenol, methyl-o-chlorophenol, ethyl-o-chlorophenol, n-propyl-o-chlorophenol, n-butyl-o-chlorophenol, n-amyl-o-chlorophenol, tert-amyl-o-chlorophenol, n-hexyl-o-chlorophenol, n-heptyl-o-chlorophenol, o-benzyl-p-chlorophenol, o-benzyl-m-methyl p-chlorophenol, o-benzyl-m,m-dimethyl-p-chlorophenol, o-phenyl-ethyl-p-chlorophenol, o-phenylethyl-m-methyl-p-chlorophenol, 3-methyl-p-chlorophenol, 3,5-dimethyl-p-chlorophenol, 6-ethyl-3-methyl-p-chlorophenol, 6-n-propyl-3-methyl-p-chlorophenol, 6-iso-propyl-3-methyl-p-chlorophenol, 2-ethyl-3,5-dimethyl-p-chlorophenol, 6-sec-butyl-3-methyl-p-chlorophenol, 2-iso-propyl-3,5-dimethyl-p-chlorophenol, 6-diethylmethyl-3-methyl-p-chlorophenol, 6-iso-propyl-2-ethyl-3-methyl-p-chlorophenol, 2-sec-amyl-3,5-dimethyl-p-chlorophenol, 2-diethylmethyl-3,5-dimethyl p-chlorophenol, 6-sec-octyl-3-methyl p-chlorophenol, p-chloro-m-cresol, p-bromophenol, methyl p-bromophenol, ethyl-p-bromophenol, n-propyl-p-bromophenol, n-butyl-p-bromophenol, n-amyl p-bromophenol, sec-amyl-p-bromophenol, n-hexyl-p-bromophenol, cyclohexyl-p-bromophenol, o-bromophenol, tert-amyl-o-bromophenol, n-hexyl-o-bromophenol, n-propyl-m,m-dimethyl-o-bromophenol, 2-phenyl phenol, 4-chloro-2-methyl phenol, 4-chloro-3-methyl phenol, 4-chloro-3,5-dimethyl phenol, 2,4-dichloro-3,5-dimethylphenol, 3,4,5,6-tetrabromo-2-methylphenol, 5-methyl-2-pentylphenol, 4-isopropyl-3-methylphenol, para-chloro-meta-xylenol, dichloro-meta xylenol, chlorothymol, 5-chloro-2-hydroxydiphenylmethane, resorcinol and its derivatives including methyl-resorcinol, ethyl-resorcinol, n-propyl-resorcinol, n-butyl-resorcinol, n-amyl-resorcinol, n-hexyl-resorcinol, n-heptyl-resorcinol, n-octyl-resorcinol, n-nonyl-resorcinol, phenyl resorcinol, benzyl-resorcinol, phenylethyl-resorcinol, phenylpropyl-resorcinol, p-chlorobenzyl resorcinol, 5-chloro-2,4-dihydroxydiphenyl methane, 4-chloro-2,4-dihydroxydiphenyl methane, 5-bromo-2,4-dihydroxydiphenyl methane, and 4-bromo-2,4-dihydroxydiphenyl methane, bis-phenolic compounds like 2,2-methylene-bis-(4-chlorophenol), 2,2-methylene-bis-(3,4,6-trichlorophenol), 2,2-methylene-bis-(4-chloro-6-bromophenol) alone or in combination.

Terpenes are a very large group of chemical substances that occur in nature as secondary ingredients from organisms. They are derived from two/three isoprene units that are known as monoterpenes and sesqui/di terpenes respectively. Suitable terpenes and/or terpenoids consist of mono-, sesqui- and diterpenes, menthol, citronellol, geraniol, nerolidol, linalool and terpineol, borneol, thujol, sabinol, myrtenol, thymol, verbenol, fenchol, piperitol, perillaaldehyde, phellandral, citronellal, citral, myrtenal, menthone, piperitone, pulegone, carvone, thujone, umbellulone, verbenone, chrysanthenone, fenchone, camphor, cineole, menthofuran, linalooloxide, rose oxide, or peroxides such ascaridole or artemisinin, hydroxycitronellal, hexylcinnamal, linaylacetate, alpha-isomethylionone, ethyl linalool, and hydroxyisohexyl-3-cyclohexene carboxaldehyde.

In accordance with another embodiment of the present application, the organic compound employed in the present application includes, but is not limited to, propanediol, caprylhydroxamic acid (CHA) or isopropyl methylphenol (IPMP) in an amount of from about 0.1 wt. % to about 10 wt. %, about 11 wt. % to about 20 wt. %, about 21 wt. % to about 30 wt. %, about 31 wt. % to about 40 wt. %, about 41 wt. % to about 50 wt. %, about 51 wt. % to about 60 wt. %, about 61 wt. % to about 70 wt. %, about 71 wt. % to about 80 wt. %, about 81 wt. % to about 90 wt. %, about 91 wt. % to about 99.9 wt. %.

According to one embodiment of the present application, the synergistic preservative composition comprises: (i) propylene carbonate; (ii) one or more organic compounds and (iii) phenoxy ethanol, a preservative compound. Non-limiting examples of additional or optional preservatives employed are selected from the group consisting of triclosan, 2-methyl-4-isothiazolin-3-one (MIT), 1,2-benzisothiazolin-3-one (BIT), 5-chloro-2-methyl-4-isothiazolin-3-one (CMIT), 2-octyl-4-isothiazolin-3-one (OIT), 3-iodo-2-propynylbutyl-carbamate (IPBC), 3-iodopropynyl-N-phenyl carbamate (IPPC), zinc pyrithione (ZnPy), bronopol, quaternary ammonium compounds, parabens, alkyl parabens, chlorphenisin, benzyl alcohol, organic acids, sorbic acid and their salts, benzoic acid and their salts, salicylic and their salts, potassium sorbate, sodium benzoate, phenoxyethanol, diazolidinyl urea, imidazolidinyl urea, sodium hydroxymethyl glycinate, hydantoins, sodium pyrithione, phenyl ethanol, phenyl propanol, benzalkonium quaternary ammonium compounds, benzethonium chloride (BZT), dequalinium chloride, fatty acids and their salts, α-hydroxy acids and their salts, beta acids and their salts, glycerols, hexyl glycerine, tropolones, sesquiterpenes, chlorhexidine, polyhexamethylene biguanide, cetrimide, chlorocresol, chlorxylenol, benzyl alcohol, bronopol, chlorbutanol, phenylethyl alcohol, formaldehyde releasing compounds, phenolic compounds, 2,4-dichlorobenzyl alcohol, thiomersal anisic acid and their salts, levulinic acid and their salts, dehydroacetic acids and their salts biguinaide (PHMB), ethyl hexyl glycerine, and combinations thereof.

Other non-limiting embodiments of the present application employ herbal extracts or mixtures of herbal extracts as a preservative or preservative system, and wherein, specific herbal extracts include, but are not limited to, extracts of chamomile, rosemary, aloe, nettle, *Centella asiatica, Ginkgo biloba*, betula witch hazel, green tea, flavonoids (quercetin, naringenin, naringin, hesperidin) extracts, white tea, grape skin, grape seed, grapefruit, grapefruit seed, grapefruit peel, citrus fruits (other than grapefruit extract) bilberry, blueberry, *Ginkgo biloba*, soy isoflavones, soy extract, fermented soy protein, black cohosh, St. John's wort, echinacea, chamomile, rosemary, aloe extract and juice, nettle, coconut fruit, *Centella asiatica*, and combinations thereof.

In accordance with another embodiment of the present application, the amount of preservative employed in the present application includes, but is not limited to, about 0.1 wt. % to about 10 wt. %, about 11 wt. % to about 20 wt. %, about 21 wt. % to about 30 wt. %, about 31 wt. % to about 40 wt. %, about 41 wt. % to about 50 wt. %, about 51 wt. % to about 60 wt %, about 61 wt. % to about 70 wt. %, about 71 wt. % to about 80 wt. %, about 81 wt. % to about 90 wt. %, about 91 wt. % to about 99.9 wt. %.

In one embodiment, it is contemplated that the possible synergistic preservative compositions of the present application can include, but are not limited to, a composition A that comprises: a mixture of (a) propylene carbonate (b) propanediol or caprylhydroxamic acid or isopropyl methylphenol and (c) phenoxyethanol; a composition B that comprises: a mixture of (a) propylene carbonate (b) propanediol and (c) phenoxyethanol; a composition C that comprises: a mixture of (a) propylene carbonate (b) caprylhydroxamic acid and (c) phenoxyethanol; a composition D that comprises: a mixture of (a) propylene carbonate (b) isopropyl methylphenol and (c) phenoxyethanol or a composition E that comprises: a mixture of (a) propylene carbonate, (b) propanediol, caprylhydroxamic acid, or isopropyl methylphenol mixtures; and (c) phenoxy ethanol.

The synergistic preservative composition of the present application is used for inhibiting or killing yeasts, mold spores, gram (+), gram (−) bacterial strains, acne causing strains, odor causing strains, or mycoses causing strains, and wherein, the compositions can inhibit, retard or kill *Candida tropicalis, Candida albicans, Hansenula anomala, Saccharomyces cerevisiae, Torulaspora delbreuckii, Zygosaccharomyces bailii, Zygosaccharomyces rouxii, Bacillus subtilis, Bacillus cereus, Staphylococcus aureus, Staphylococus epidermidis, Escherichia coli, Salmonella typhimurium, Salmonella enteritidis, Pseudomonas aeruginosa, Aspergillus niger, Aspergillus flavus, Penicillium islandicum, Penicillium citrinum, Penicillium chrysogenum, Fusarium oxysporum, Fusarium graminearum, Fusarium solani, Alternaria alternata, Aspergillus brasiliensis, Burkhodelia cepacia, Enterobacter aerogenes, Enterobacter cloacae, Enterobacter gergoviae, Klebsiella pneumoniae, Proteus vulgaris, Pseudomonas fluorescens, Pseudomonas putida, Penicillium pinophilum* and/or *Mucor racemosus*.

According to another embodiment of the present application, the synergistic combination of organic compounds or synergistic combination of preservative compounds are identified according to their ability or selectivity or specificity to kill or inhibit specific microbial organisms. Such selectivity or specificity is identified based on series of due experimentation that can readily be carried out by the skilled artisan to find such specificity or selectivity of said organic compounds/preservatives compounds towards any specific microorganisms.

Preservative compositions of present application are stable on storage for at least 2 years at room temperature. Further, the composition is used for withstanding heat and cold exposure, wherein the composition is stable for at least 5 freeze/thaw cycles when the temperature is cycled from 50° C. to −24° C. in every 24 hours or stable for at least 4 weeks at about 50° C.

The synergistic preservative compositions can be aqueous or non-aqueous in nature, and they can be delivered through different formulation technique that are known in the prior art, wherein non-limiting exemplary formulations include emulsions, microemulsions, nanoemulsions, solutions, dispersions, suspensions, complex coacervates, lamellar gel systems, liposomes, niosomes, or concentrates.

Such formulated synergistic preservative composition comprising propylene carbonate, at least one organic compound and a preservative can be used in various end-user based consumer applications, particularly in cosmetic products, toiletry products, personal care products, oral care products, skin care products, hair care products, household & cleaning products, soap and bath products, industrial and institutional cleaning products, disinfecting products, wound care, sanitary products, agricultural compositions, textile industries, coating industries and/or laundry products. The amount of preservative composition employed in aqueous and non-aqueous based end-user products/compositions is in the range of from about 0.01 wt. % to about 1.0 wt. % of the total composition. Other ranges include about 1.0 wt. % to about 2.0 wt. %, about 2.0 wt. % to about 3.0 wt. %, about 3.0 wt. % to about 4.0 wt. %, about 4.0 wt. % to about 5.0 wt. %.

One embodiment of the present application relate to a process for preparing the above-described synergistic preservative composition, said process comprising mixing (i) about 0.1 wt. % to about 99.9 wt. % of propylene carbonate; (ii) about 0.1 wt. % to about 99.9 wt. % of one or more organic compounds selected from the group consisting of diols, C2-C20 alkane diols, glycerins, C4-C18 alkyl glycerins, esters of glycerins, organic acids and their sodium/potassium salts, C2-C20 fatty acids and their sodium/potassium salts, esters of organic acids, esters of C2-C20 fatty acids, terpenes, amino acids, phenolic compounds, natural preservatives, herbal preservatives, and/or oils derived from natural products; and (iii) about 0.1 wt. % to 99.0 wt. % of a preservative to provide homogenous solution.

One embodiment of the present application discloses a synergistic preservative composition which used for providing broad spectrum antimicrobial activity comprising: (i) about 0.1 wt. % to about 99.9 wt. % of propylene carbonate; (ii) about 0.1 wt. % to about 99.9 wt. % one or more organic compounds selected from the group consisting of diols, alkane diols, organic acids and their salts, fatty acids and their salts, esters of long chain fatty acids or phenolic compounds, amino acids, terpenes, alone or combinations thereof; and (iii) about 0.1 wt. % to 99.0 wt. % of preservative.

Another embodiment of the present application provides a synergistic preservative composition which is used for providing broad spectrum antimicrobial activity comprising: (i) about 0.1 wt. % to about 99.9 wt. % of propylene carbonate; (ii) about 0.1 wt. % to about 99.9 wt. % of one or more organic compounds selected from the group consisting of propanediol, caprylhydroxamic acid, and isopropyl methyl phenol; and (iii) about 0.1 wt. % to 99.0 wt. % of phenoxyethanol, a preservative compound.

Yet another embodiment of the present application provides a cosmetic or personal care or house hold, cleaning, Industrial & Institutional product comprising synergistic preservative composition comprising (i) about 0.1 wt. % to about 99.9 wt. % of propylene carbonate; (ii) about 0.1 wt. % to about 99.9 wt. % of one or more organic compounds, and wherein, inclusion of each additional organic compound can demonstrate synergistic effect; and (iii) about 0.1 wt. % to 99.0 wt. % of preservative compound, and wherein, inclusion of each preservative compound can demonstrate synergistic effect, wherein the Synergy Index (SI) value of the total composition is from about 0.05 to about 1.0. The amount of said preservative composition present in the cosmetic or personal care or house hold, cleaning, Industrial & Institutional products is in the range of from about 0.01 wt. % to 5.0 wt. %, relative to the total mass of said products.

Still another embodiment of the present application discloses a method of killing bacteria, fungi, molds, yeasts and viruses or inhibiting their growth in a cosmetic, personal care, house hold, cleaning, and/or Industrial & Institutional products susceptible to growth of microorganisms comprising incorporating into said products, about 0.01 wt. % to 5.0 wt. % of preservative composition of present application.

The following examples are presented for purposes of demonstrating, but not limiting, the preparation and use of the polymers. In the examples, the following abbreviations are used:

PC: Propylene carbonate
CHA: Capryl Hydroxamic acid
IPMP: Isopropyl Methyl phenol
PO: Phenoxy ethanol
Zemea: Zemea® Propanediol Further, certain aspects of the present application are illustrated in detail by way of the following examples. The examples are given herein for illustration of the application and are not intended to be limiting thereof.

EXAMPLES

Examples 1: Synergy/Efficacy for Preservative Formulations Containing PC (Propylene Carbonate), CHA (CaprylHydroxamic Acid) and IPMP (Isopropyl Methylphenol)

The below Tables 1 to 3 provide different synergistic compositions prepared for the purposes of this invention:

TABLE 1

| Synergistic composition 1 | |
| --- | --- |
| Ingredients | wt. % |
| Propylene Carbonate | 22.00 |
| 1,3 Propanediol | 25.00 |
| Phenoxyethanol | 40.0% |
| CHA | 10.0% |
| IPMP | 3.0% |
| Total | 100.00 |

TABLE 2

| Synergistic composition 2 | |
| --- | --- |
| Ingredients | wt. % |
| Propylene Carbonate | 20.00 |
| 1,3 Propanediol | 25.00 |
| Phenoxyethanol | 40.0% |
| CHA | 10.0% |
| IPMP | 5.0% |
| Total | 100.00 |

TABLE 3

| Synergistic composition 3 | |
| --- | --- |
| Ingredients | wt. % |
| Propylene Carbonate | 15.00 |
| 1,3 Propanediol | 30.00 |
| Phenoxyethanol | 40.0% |
| CHA | 10.0% |
| IPMP | 5.0% |
| Total | 100.00 |

Examples 2: Synergistic Activity

The synergistic activity of PC and (CHA+IPMP) compounds were performed against selected microbial strains. The synergism of these compositions is demonstrated by testing a wide range of concentrations and ratios of compounds as follows.

Tryptic Soy Broth (TSB) media was used for bacterial evaluations and Yeast Malt Broth (YMB) for fungal evaluations. The IPMP solution is prepared by combining 0.25% IPMP with 20% DMSO and water (q.s. 100%). The CHA solution was prepared by combining 0.5% CHA with 20% DMSO and water (q.s. 100%). The compounds are then added to the media (50 μL) and serially diluted. The same amount of PC was added to all wells (e.g. 50 μL of 6.25% solution). 100 μl of a suspension of the testing bacteria or fungi are added to a final concentration of approximately $10^6$ CFU/ml in double concentrated media. The inoculated media is then incubated at 32° C. for 2-5 days for bacteria or at 28° C. for 3-7 days for fungi.

The lowest concentration of each compound or mixture of compounds to inhibit visible growth is taken as the minimum inhibitory concentration (MIC). The MIC is taken as end points of activity. End points for the mixture of compound A (CHA) and compound B (IPMP) with and without PC are then compared with the end points for the pure active ingredient alone.

Synergism was determined by a commonly used and accepted method described by Kull A. C; Eisman, P. C.; Sylwestrowicz, H. D. and Mayer, R. L. 1961. Applied Microbiology, 9:538-541 using the ratio determine by:

$$Qa/QA + Qb/QB = \text{Synergy}$$

Wherein:
QA is the concentration of compound A in PPM, acting alone, which produced an end point.
Qa is the concentration of compound A in PPM, in the mixture, which produced an end point.
QB is the concentration of compound B in PPM, acting alone, which produced an end point.
Qb is the concentration of compound B in PPM, in the mixture, which produced an end point When the sum of Qa/QA+Qb/QB is greater than one, antagonism is indicated. When the sum is equal to one, additive is indicated. When the sum is less than one, synergism is demonstrated.

The experiments were performed to understand the synergistic effect between propylene carbonate and (CHA+IPMP). The results of synergism between PC and (CHA+IPMP) compounds are shown in Table 4.

The results comprise following parameters: 1. Test organism (bacteria or fungi), 2. The end-point activity in % measured by MIC for the compound A alone (QA), for compound A in the mixture (Qa), for compound B alone (QB), for compound B in the mixture (Qb), 3. The ratio of CHA and IPMP (compound A and B) in that particular combination, 4. The sum of Qa+Qb (total ppm that inhibited growth) and 5. and the synergy index (SI) based on the formula SI=Qa/QA+Qb/QB

TABLE 4

Synergistic study of PC and (CHA + IPMP)

| | | MIC in ppm | | | | | | |
|---|---|---|---|---|---|---|---|---|
| | | CHA Qa | IPMP Qb | CHA QA | IPMP QB | ratio Qa:Qb | Total ppm ΣQa + Qb | SI index |
| A. niger | No PC | 156.3 | 19.5 | 312.5 | 156.3 | 8:1 | 175.8 | 0.63 |
| | | 156.3 | 39.1 | 312.5 | 156.3 | 4:1 | 195.4 | 0.75 |
| | 0.39% PC | 156.3 | 4.9 | 312.5 | 156.3 | 32:1 | 161.2 | 0.53 |
| | | 156.3 | 9.8 | 312.5 | 156.3 | 16:1 | 166.1 | 0.56 |
| | | 78.1 | 78.1 | 312.5 | 156.3 | 1:1 | 156.2 | 0.75 |
| | | 39.1 | 78.1 | 312.5 | 156.3 | 1:2 | 117.2 | 0.62 |
| | 0.78% PC | 156.3 | 1.2 | 312.5 | 156.3 | 130:1 | 157.5 | 0.51 |
| | | 78.1 | 19.5 | 312.5 | 156.3 | 4:1 | 97.6 | 0.37 |
| | | 78.1 | 39.1 | 312.5 | 156.3 | 2:1 | 117.2 | 0.5 |
| B. cepacia | No PC | 312.5 | 312.5 | 312.5 | 312.5 | 1:1 | | no SI |
| | 0.39% PC | 156.3 | 1.2 | 312.5 | 312.5 | 130:1 | 157.5 | 0.5 |
| | | 156.3 | 19.5 | 312.5 | 312.5 | 8:1 | 175.8 | 0.56 |
| | | 78.1 | 39.1 | 312.5 | 312.5 | 2:1 | 117.2 | 0.37 |
| | | 39.1 | 39.1 | 312.5 | 312.5 | 1:1 | 78.2 | 0.25 |
| | | 9.8 | 78.1 | 312.5 | 312.5 | 1:8 | 87.9 | 0.28 |
| | 0.78% PC | 19.5 | 0.6 | 312.5 | 312.5 | 32:1 | 20.1 | 0.06 |
| | | 9.8 | 9.8 | 312.5 | 312.5 | 1:1 | 19.6 | 0.06 |
| E. coli | No PC | 312.5 | 156.3 | 625 | 625 | 2:1 | 468.8 | 0.75 |
| | | 19.5 | 312.5 | 625 | 625 | 1:16 | 332 | 0.53 |
| | 0.39% PC | 312.5 | 4.9 | 625 | 625 | 64:1 | 317.4 | 0.51 |
| | | 312.5 | 78.8 | 625 | 625 | 4:1 | 391.3 | 0.75 |
| | 0.78% PC | 156.3 | 0.6 | 625 | 625 | 260:1 | 156.9 | 0.25 |
| | | 156.3 | 156.3 | 625 | 625 | 1:1 | 312.6 | 0.75 |
| C. albicans | No PC | 156.3 | 39.1 | 312.5 | 312.5 | 4:1 | 195.4 | 0.62 |
| | | 156.3 | 78.1 | 312.5 | 312.5 | 2:1 | 234.4 | 0.75 |
| | | 39.1 | 156.3 | 312.5 | 312.5 | 1:4 | 195.4 | 0.62 |
| | | 78.1 | 156.3 | 312.5 | 312.5 | 1:2 | 234.4 | 0.75 |
| | 0.39% PC | 156.3 | 4.9 | 312.5 | 312.5 | 32:1 | 161.2 | 0.51 |
| | | 156.3 | 19.5 | 312.5 | 312.5 | 8:1 | 175.8 | 0.56 |
| | | 9.8 | 156.3 | 312.5 | 312.5 | 1:16 | 166.1 | 0.51 |
| | | 19.5 | 156.3 | 312.5 | 312.5 | 1:8 | 175.8 | 0.56 |
| | 0.78% PC | 156.3 | 0.6 | 312.5 | 312.5 | 260:1 | 156.9 | 0.5 |
| | | 156.3 | 2.4 | 312.5 | 312.5 | 65:1 | 158.7 | 0.5 |

Example 3: Efficacy Data

Efficacy data of the synergistic preservative compositions were generated in different products following a 28-day double inoculation challenge tests. Briefly, the samples containing the synergistic preservative compositions or a control (no preservative) were inoculated with either Gram positive bacteria (*Staphylococcus aureus* 6538), a composite of Gram negative bacteria (Bac comp) (*Escherichia coli* 8739, *Pseudomonas aeruginosa* 9027 and *Burkholderia cepacia* 25416), or a mold composite (Mold comp) (*Candida albicans* 10231, and *Aspergillus brasiliensis* 16404). The bacteria were inoculated at day 0 and day 21 to a final concentration of about $10^{6-7}$ cfu/ml and the fungal composite was inoculated at day 0 and day 21 to a final concentration of about $10^{5-6}$ spores/ml. The inoculated samples were plated at days 2, 7, 14, 21 and 28. The recovery media is Letheen Agar for bacteria and Potato Dextrose agar for fungi.

Example 4: Evaluation of Preservative Compositions in Commercial Prolipid Lamellar Composition A standard Prolipid lamellar composition was used to test the efficacy of the synergistic preservative compositions at different levels. A sample containing no preservative was used as control for the evaluation. The preservative formulations were employed for the evaluation test are disclosed in Examples 1 (Table 1 and Table 3).

TABLE 5

Evaluation of preservative compositions

| Ingredients | % w/w |
|---|---|
| Phase A | |
| Aqua | q.s 100 |
| PVM/MA Decadiene Crosspolymer | 0.3 |
| Disodium EDTA | 0.05 |
| Glycerin | 3.00 |
| Phase B | |
| Glyceryl Stearate (AND) Behenyl Alcohol AND Palmitic Acid AND Stearic Acid AND Lecithin AND Lauryl Alcohol AND Myristyl Alcohol AND Cetyl Alcohol | 5.00 |
| Octyldodecyl Stearate | 3.00 |
| Isodecyl Neopentanoate | 3.00 |
| Ethylhexyl Palmitate | 2.00 |
| Jojoba Oil | 3.00 |
| Phase C | |
| Sodium Hydroxide (2%) | 3.40 |
| Phase D | |
| Preservative/NaOH | 1-1.6 |

The results of efficacy test for both synergistic composition tested demonstrated that the compositions can kill gram positive and gram negative bacterial strains, yeast and fungi. The microorganisms recovered at each time interval are shown in the following Table 6.

TABLE 6

Preservative Evaluation Test of Prolipid lamellar composition, pH 6.5

| Product Description | Microbes | Day 2 | Day 7 | Day 14 | Day 21 | Day 28 |
|---|---|---|---|---|---|---|
| Example 1 (Table 3) @ 1.00% | Bacteria | 2.2E+04 | 1.4E+03 | 7.0E+01 | <10 | 2.8E+03 |
| | Yeast | 2.7E+04 | 1.8E+02 | <10 | <10 | 3.0E+02 |
| | Mold | 6.0E+04 | 2.0E+02 | <10 | <10 | 2.0E+02 |
| Example 1 (Table 3) @ 1.55% | Bacteria | 4.4E+02 | <10 | <10 | <10 | <10 |
| | Yeast | 2.8E+03 | <10 | <10 | <10 | <10 |
| | Mold | 4.0E+04 | <10 | <10 | <10 | <10 |
| Example 1 (Table 1) @ 1.00% | Bacteria | 4.5E+04 | 3.3E+03 | 2.3E+02 | 1.0E+01 | 5.1E+02 |
| | Yeast | 1.0E+04 | 9.0E+02 | <10 | <10 | 5.0E+02 |
| | Mold | 1.0E+05 | 7.0E+03 | <10 | <10 | 5.0E+02 |
| Example 1 (Table 1) @ 1.58% | Bacteria | 2.4E+02 | <10 | <10 | <10 | <10 |
| | Yeast | 1.2E+03 | <10 | <10 | <10 | <10 |
| | Mold | 2.0E+04 | <10 | <10 | <10 | <10 |
| No Preservative (control) | Bacteria | >3.0E+06 | >3.0E+06 | >3.0E+06 | >3.0E+06 | >3.0E+06 |
| | Yeast | 2.5E+05 | 1.9E+05 | 1.1E+05 | 8.7E+04 | 7.0E+05 |
| | Mold | 1.0E+05 | 1.0E+05 | 3.0E+04 | 5.0E+04 | 2.6E+05 |

As shown in the Table 6, the prolipid lamellar composition containing formulations of Examples 1 (Table 1 and 3) at about 1.6% by wt., were very effective in controlling microbial growth after 2 microbial challenges. Lower levels were not as effective. The unpreserved control was susceptible to microbial growth.

Example 5: A Facial Mask Composition as Described Below was Prepared, and Wherein, a Preservative Composition of Example 1 (Tables 1 and 3) were Incorporated as Phase D at 0.5% by Wt. or No Preservative to Serve as a Control

TABLE 7

Evaluation of preservative compositions in a facial mask

| Ingredients | % w/w |
|---|---|
| Phase A | |
| Water/Aqua | q.s 100 |
| Tetrasodium EDTA | 0.05 |
| Hydroxyethylcellulose | 0.20 |
| Phase B | |
| Water/Aqua | 30.00 |
| Carbomer | 0.10 |
| Phase C | |
| Sodium Hydroxide (and) Water | 0.40 |
| Phase D | |
| Glycerin (and) Glyceryl Acrylate/Acrylic Acid Copolymer (and) Propylene Glycol (and) PVM/MA Copolymer | 5.00 |
| Sodium Hyaluronate | 0.05 |
| Preservative | 0.5 |

The facial mask was then challenged with microorganism as described in Example 4. The microorganisms recovered at each time interval are shown in the following Table 8.

TABLE 8

Preservative Evaluation in facial mask. pH 6.8

| Preservative Description | Microbes | Day 2 | Day 7 | Day 14 | Day 21 | Day 28 |
|---|---|---|---|---|---|---|
| Example 1 (Table 3) at 0.5% | Bacteria | <10 | <10 | <10 | <10 | <10 |
| | Yeast | <10 | <10 | <10 | <10 | <10 |
| | Mold | 1.7E+03 | <10 | <10 | <10 | <10 |
| No Preservative (control) | Bacteria | >3.0E+06 | >3.0E+06 | >3.0E+06 | >3.0E+06 | >3.0E+06 |
| | Yeast | 3.8E+05 | 4.3E+05 | 5.2E+05 | 4.4E+05 | 6.8E+05 |
| | Mold | 1.7E+05 | 1.5E+05 | 1.7E+05 | 1.0E+05 | 1.7E+05 |
| Example 1 (Table 1) @ 0.5% | Bacteria | <10 | <10 | <10 | <10 | <10 |
| | Yeast | <10 | <10 | <10 | <10 | <10 |
| | Mold | 1.5E+03 | <10 | <10 | <10 | <10 |

As shown in the Table 2, the facial mask containing composition Examples 1 and 3 at 0.5% by wt. significantly reduced the levels of inoculated bacteria, yeast and mold and prevented their growth. The unpreserved control sample was susceptible to significant microbial growth.

Example 6: Evaluation of Preservative Compositions in Non-Ionic Emulsion

A non-ionic emulsion as described below was prepared, and wherein, a preservative composition of Example 1 was incorporated as phase A at 1.25% by wt. or no preservative to serve as a control.

TABLE 9

Preservative composition in non-ionic emulsion

| Ingredients | % w/w |
|---|---|
| Phase A | |
| Water/Aqua | q.s.100 |
| Tetrasodium EDTA | 0.05 |
| Water/Aqua (and) Glycerin (and) Glyceryl Acrylate/Acrylic Acid Copolymer (and) Phenoxyethanol | 3.0 |
| Preservative | 1.25 |
| Phase B | |
| Acrylic Acid/VP Crosspolymer | 0.6 |
| Phase C | |
| Sodium Hydroxide | 0.02 |
| Water/Aqua | 0.5 |
| Phase D | |
| Stearyl Dimethicone | 2.0 |
| PEG-100 Stearate (and) Glyceryl Stearate | 2.0 |
| Butyrospennum Parkii (Shea) Butter | 2.0 |
| Cetyl Lactate | 1.5 |
| Octyldodecyl Stearate | 5.0 |
| Ethylhexyl Palmitate | 4.0 |
| Phase E | |
| Sodium Hydroxide | 0.03 |
| Water/Aqua | 0.5 |

The non-ionic emulsion was challenged with microorganism as described in Example 4. The microorganisms recovered at each time interval are shown in the following Table 10.

TABLE 10

Preservative Evaluation in anon-ionic emulsion, pH 5.5

| Product Description | Microbes | Day 2 | Day 7 | Day 14 | Day 21 | Day 28 | Day 35 |
|---|---|---|---|---|---|---|---|
| Example 1 | Bacteria | <10 | <10 | <10 | <10 | <10 | <10 |
| at 1.25% | Yeast | 7.0E+03 | 3.7E+02 | <10 | <10 | 1.2E+02 | <10 |
| | Mold | 6.0E+04 | 1.4E+02 | <10 | <10 | 1.0E+01 | <10 |
| No Preservative | Bacteria | >3.0E+06 | >3.0E+06 | >3.0E+06 | >3.0E+06 | >3.0E+06 | \ |
| (control) | Yeast | 5.3E+05 | 2.8E+05 | 1.9E+05 | 7.0E+04 | 7.0E+04 | \ |
| | Mold | 1.2E+05 | 1.5E+05 | 1.3E+05 | 1.0E+05 | 2.9E+05 | \ |

As shown in the Table 3, the non-ionic emulsion containing composition of Example 1 at 1.25% by wt. reduced the levels of inoculated bacteria, yeast and mold and prevented their growth. The rate of kill in this formulation was slow, as it took 14 days to kill all microorganism after each microbial challenge. The unpreserved control sample was susceptible to microbial growth.

Example 7: Evaluation of Preservative Compositions in a Clear Silicone Free Shampoo A non-ionic emulsion as described below was prepared, and the preservative composition of Example 1 (Table 3) was incorporated at 1.5% by wt. or no preservative to serve as a control.

TABLE 11

| Preservative composition in non-ionic emulsion | |
|---|---|
| Ingredients | %, w/w |
| Aqua Deionized Water | q.s. 100 |
| Acrylamidopropyl trimonium chloride/acrylamide copolymer | 0.1 |
| EDTA-2Na | 0.1 |
| Cocamidopropyl Betaine | 4.0 |
| Coconut Diethanol Amide | 3.0 |
| Sodium Laureth Sulfate (2EO) | 15.0 |
| Ammonium Dodecyl Sulfate | 2.0 |
| Sodium Chloride | 0.6 |
| Preservative | 1.5 |

The clear silicone shampoo was challenged with microorganism as described in Example 4. The microorganisms recovered at each time interval are shown in the following Table 12.

TABLE 12

Preservative Evaluation in a clear silicon free shampoo, pH 6.6

| Product Description | Microbes | Day 2 | Day 7 | Day 14 | Day 21 | Day 28 | Day 35 |
|---|---|---|---|---|---|---|---|
| Example 1 (Table 3) @ 1.50% | Bacteria | 4.0E+01 | <10 | <10 | <10 | <10 | \ |
| | Yeast | <100 | <100 | <100 | <100 | <100 | \ |
| | Mold | 1.6E+03 | <100 | <100 | <100 | 3.0E+02 | <100 |
| No Preservative (control) | Bacteria | 2.1E+04 | <10 | <10 | <10 | 1.0E+01 | \ |
| | Yeast | <100 | <100 | <100 | <100 | 2.0E+02 | \ |
| | Mold | 2.3E+03 | 5.0E+03 | 1.4E+03 | 2.0E+03 | 1.5E+04 | \ |

As shown in the Table 4, the clear silicon free shampoo containing composition Example 1 (Table 3) at 1.5% % by wt. reduced the levels of inoculated bacteria, yeast and mold and prevented their growth. The rate of kill of the fungal inoculum was slow, and it took about 14 days to kill all the mixed fungal inoculum after each inoculation. The unpreserved control sample was susceptible to microbial growth.

The experiments are performed to understand the synergistic effect between propylene carbonate and CHA without IPMP.

The results of synergism between PC and CHA without IPMP compounds are shown in Table 13 and 14.

TABLE 13

Blends without IPMP in Facial mask prototypes

| Product Description | Microbes | 2 D | 7 D | 14 D | 21 D | 28 D |
|---|---|---|---|---|---|---|
| 0.5% 1120-177-1 (30% zemea. 20% PC, 40% PO, 10% CHA) | Bacteria | 1.0E+06 | 3.4E+05 | 7.1E+04 | >3.0E+03 | >3.0E+03 |
| | Yeast | 1.2E+05 | 7.7E+03 | 7.0E+02 | <10 | 5.0E+04 |
| | Mold | 1.0E+05 | 2.3E+04 | <10 | <10 | 3.0E+04 |
| 0.5% 1120-190-1 (36% zemea, 11% PC, 40% PO, 13% CHA) | Bacteria | 8.7E+05 | 3.8E+04 | 1.6E+03 | <10 | 3.0E+04 |
| | Yeast | 2.7E+04 | 1.9E+03 | 8.0E+02 | <10 | 5.2E+03 |
| | Mold | 4.0E+04 | 2.7E+03 | <10 | <10 | 6.8E+03 |
| 0.5% 1120-191-1 (25% zemea, 22% PC, 40% PO, 10% CHA, 3% IPMP) | Bacteria | <10 | <10 | <10 | <10 | <10 |
| | Yeast | <10 | <10 | <10 | <10 | <10 |
| | Mold | 1.5E+03 | <10 | <10 | <10 | <10 |
| No Preservative | Bacteria | >3.0E+06 | >3.0E+06 | >3.0E+06 | >3.0E+06 | >3.0E+06 |
| | Yeast | 3.8E+05 | 4.3E+05 | 5.2E+05 | 4.4E+05 | 6.8E+05 |
| | Mold | 1.7E+05 | 1.5E+05 | 1.7E+05 | 1.0E+05 | 1.7E+05 |

TABLE 14

Preservative blends without IPMP

| Ingredients | % w/w |
|---|---|
| Phase A | |
| Water/Aqua | q.s. 100 |
| Disodium EDTA | 0.05 |
| Hydroxyethylcellulose | 0.20 |
| Phase B | |
| Water/Aqua | 30.00 |
| Carbomer | 0.10 |
| Phase C | |
| Sodium Hydroxide (and) Water | 0.40 |
| Phase D | |
| Glycerin (and) Glyceryl Acrylate/Acrylic Acid Copolymer (and) Propylene Glycol (and) PVM/MA Copolymer | 5.00 |

The experiments were performed to understand the synergistic effect between propylene carbonate and IPMP without CHA.

The results of synergism between PC and IPMP without CHA compound are shown in Table 15, Table 16, Table 17, Table 18 and Table 19.

TABLE 15

Blends without CHA in Prolipid 141 cream prototypes

| Product Description | Microbes | 2 D | 7 D | 14 D | 21 D | 28 D |
|---|---|---|---|---|---|---|
| 1.00% 1120-199-3 (25% zemea, 22% PC, | Bacteria | 4.5E+04 | 3.3E+03 | 2.3E+02 | 1.0E+01 | 5.1E+02 |
| | Yeast | 1.0E+04 | 9.0E+02 | <10 | <10 | 5.0E+02 |

TABLE 15-continued

Blends without CHA in Prolipid 141 cream prototypes

| Product Description | Microbes | 2 D | 7 D | 14 D | 21 D | 28 D |
|---|---|---|---|---|---|---|
| 40% PO, 10% CHA, 3% IPMP) | Mold | 1.0E+05 | 7.0E+03 | <10 | <10 | 5.0E+02 |
| 1.58% 1120-199-3 | Bacteria | 2.4E+02 | <10 | <10 | <10 | <10 |
| (25% zemea, 22% PC, | Yeast | 1.2E+03 | <10 | <10 | <10 | <10 |
| 40% PO, 10% CHA, 3% IPMP) | Mold | 2.0E+04 | <10 | <10 | <10 | <10 |
| 1.49% 1081-3-2 | Bacteria | 1.2E+06 | 1.7E+05 | 1.4E+04 | 3.4E+02 | >3.0E+04 |
| (25% zemea, 30% PC, | Yeast | 2.0E+04 | <10 | <10 | <10 | 8.0E+02 |
| 40% PO, 5% IPMP) | Mold | 1.5E+05 | 1.0E+05 | 7.0E+03 | 3.7E+03 | >3.0E+04 |
|  | Bacteria | >3.0E+06 | >3.0E+06 | >3.0E+06 | >3.0E+06 | >3.0E+06 |
| No Preservative | Yeast | 2.5E+05 | 1.9E+05 | 1.1E+05 | 8.7E+04 | 7.0E+05 |
|  | Mold | 1.0E+05 | 1.0E+05 | 3.0E+04 | 5.0E+04 | 2.6E+05 |

TABLE 16

Preservative blends without CHA

| Ingredients | % w/w |
|---|---|
| Phase A | |
| Aqua | 74.25 |
| PVM/MA Decadiene Crosspolymer | 0.3 |
| Disodium EDTA | 0.05 |
| Glycerin | 3.00 |
| Phase B | |
| Glyceryl Stearate (AND) Behenyl Alcohol (AND) Palmitic Acid (AND) Stearic Acid (AND) Lecithin (AND) Lauryl Alcohol (AND) Myristyl Alcohol (AND) Cetyl Alcohol | 5.00 |
| Octyldodecyl Stearate | 3.00 |
| Isodecyl Neopentanoate | 3.00 |
| Ethylhexyl Palmitate | 2.00 |
| Jojoba Oil | 3.00 |
| Phase C | |
| Sodium Hydroxide (2%) | 3.40 |
| Phase D | |
| Preservative/NaOH | 3.00 |

TABLE 18

Preservative blends without CHA in Nonionic emulsion

| Ingredients | % w/w |
|---|---|
| Phase A | |
| Water/Aqua | 77.8 |
| Disodium EDTA | 0.05 |
| Water/Aqua (and) Glycerin (and) Glyceryl Acrylate/Acrylic Acid Copolymer (and) Phenoxyethanol | 3.0 |
| 72% Phenoxyethanol, 16% MP, 8% EP, 4% PP | 1.0 |
| Phase B | |
| Acrylic Acid/VP Crosspolymer | 0.6 |
| Phase C | |
| Sodium Hydroxide | 0.02 |
| Water/Aqua | 0.5 |
| Phase D | |
| Stearyl Dimethicone | 2.0 |
| PEG-100 Stearate (and) Glyceryl Stearate | 2.0 |
| Butyrospermum Parkii (Shea) Butter | 2.0 |
| Cetyl Lactate | 1.5 |
| Octyldodecyl Stearate | 5.0 |
| Ethylhexyl Palmitate | 4.0 |

TABLE 17

Preservative blends without CHA in Nonionic emulsion

| Product Description | Microbes | 2 D | 7 D | 14 D | 21 D | 28 D | 35 D | |
|---|---|---|---|---|---|---|---|---|
| 1.00% 1120-199-3 | Bacteria | 3.0E+04 | <10 | <10 | <10 | 2.0E+01 | <10 | 0.40% PO, 0.10% |
| (25% zemea, 22% PC, | Yeast | 7.0E+03 | 4.5E+02 | <10 | <10 | 5.0E+02 | <10 | CHA, 0.03% |
| 40% PO, 10% CHA, 3% IPMP) | Mold | 7.0E+04 | 3.0E+02 | <10 | <10 | 1.0E+01 | <10 | IPMP |
| 1.25% 1120-199-3 | Bacteria | <10 | <10 | <10 | <10 | <10 | <10 | 0.50% PO, |
|  | Yeast | 7.0E+03 | 3.7E+02 | <10 | <10 | 1.2E+02 | <10 | 0.125% CHA, |
| 1.25% 1081-9-1 | Mold | 6.0E+04 | 1.4E+02 | <10 | <10 | 1.0E+01 | <10 | 0.0375% IPMP |
|  | Bacteria | 1.6E+05 | 1.0E+02 | <10 | <10 | 3.6E+02 | \ | 0.75% PO, 0.10% |
| (32% PC, 60% PO, | Yeast | 2.3E+04 | <10 | <10 | <10 | <10 | \ | IPMP |
| 8% IPMP) | Mold | 9.0E+04 | 7.0E+03 | <10 | <10 | >3.0E+03 | \ | |
| No Preservative | Bacteria | >3.0E+06 | >3.0E+06 | >3.0E+06 | >3.0E+06 | >3.0E+06 | \ | |
|  | Yeast | 5.3E+05 | 2.8E+05 | 1.9E+05 | 7.0E+04 | 7.0E+04 | \ | |
|  | Mold | 1.2E+05 | 1.5E+05 | 1.3E+05 | 1.0E+05 | 2.9E+05 | \ | |

TABLE 18-continued

Preservative blends without CHA in Nonionic emulsion

| Ingredients | % w/w |
|---|---|
| Phase E | |
| Sodium Hydroxide | 0.03 |
| Water/Aqua | 0.5 |

TABLE 19

Prototype of nonionic emulsion

| Ingredients | % w/w |
|---|---|
| Phase A | |
| Water/Aqua | 76.8 |
| Disodium EDTA | 0.05 |
| Water/Aqua (and) Glycerin (and) Glyceryl Acrylate/Acrylic Acid Copolymer (and) Phenoxyethanol | 3.00 |
| Phase B | |
| Acrylic Acid/VP Crosspolymer | 0.6 |

TABLE 19-continued

Prototype of nonionic emulsion

| Ingredients | % w/w |
|---|---|
| Phase C | |
| Sodium Hydroxide | 0.02 |
| Water/Aqua | 0.50 |
| Phase D | |
| Stearyl Dimethicone | 2.0 |
| PEG-100 Stearate (and) Glyceryl Stearate | 2.0 |
| Butyrospermum Parkii (Shea) Butter | 2.0 |
| Cetyl Lactate | 1.5 |
| Octyldodecyl Stearate | 5.0 |
| Ethylhexyl Palmitate | 4.0 |
| Phase E | |
| Sodium Hydroxide | 0.03 |
| Water/Aqua | 0.50 |

The experiments were performed to understand the synergistic effect between zemea and propylene carbonate, CHA or IPMP and mixtures.

The results of synergism between zemea and propylene carbonate, CHA or IPMP and their mixtures are shown in Table 20.

TABLE 20

Emulsions preserved with only PO/IPMP or their combination, only CHA and combinations of PO and CHA, or PO, CHA and IPMP

| Product Description | Microbes | 2 D | 7 D | 14 D | 21 D | 28 D | |
|---|---|---|---|---|---|---|---|
| 1.25% | Bacteria | 6.7E+02 | <10 | <10 | <10 | <10 | 0.5% PO |
| (60% zemea, 40% PO) | Yeast | 4.0E+04 | 1.8E+04 | 1.9E+04 | 2.0E+04 | 4.0E+04 | |
| | Mold | 6.0E+04 | 5.4E+04 | 1.5E+05 | 1.5E+05 | 1.9E+05 | |
| 1.25% | Bacteria | 2.0E+01 | <10 | <10 | <10 | 6.0E+01 | 0.125% CHA* |
| (90% zemea, 10% CHA) | Yeast | 3.0E+04 | <10 | <10 | <10 | <10 | |
| | Mold | 9.0E+04 | 4.1E+03 | <10 | <10 | 1.3E+04 | |
| 1.25% | Bacteria | 3.7E+05 | 7.4E+03 | <10 | <10 | >3.0E+04 | 0.0375% IPMP |
| (97% zemea, 3% IPMP) | Yeast | 7.4E+05 | 1.1E+04 | 9.8E+05 | 7.8E+05 | 8.0E+05 | |
| | Mold | 7.0E+04 | 4.0E+04 | 1.2E+05 | 4.0E+04 | 5.0E+05 | |
| 1.25% | Bacteria | <10 | <10 | <10 | <10 | <10 | 0.5% PO* |
| (50% zemea, 40% PO, | Yeast | 9.0E+04 | <10 | <10 | <10 | <10 | 0.125% CHA* |
| 10% CHA) | Mold | 6.0E+04 | <10 | <10 | <10 | <10 | |
| 1.25% | Bacteria | 8.5E+04 | <10 | <10 | <10 | 2.6E+02 | 0.5% PO |
| (57% zemea, 40% PO, | Yeast | 7.0E+04 | <10 | <10 | <10 | <10 | 0.0375% IPMP |
| 3% IPMP) | Mold | 3.0E+04 | 5.1E+03 | 1.0E+02 | <10 | 4.2E+04 | |
| 1.25% | Bacteria | 3.8E+04 | <10 | <10 | <10 | >3.0E+03 | 0.125% CHA |
| (87% zemea, 10% CHA, | Yeast | <10 | <10 | <10 | <10 | <10 | 0.0375% IPMP |
| 3% IPMP) | Mold | 3.0E+04 | 4.0E+02 | <10 | <10 | 5.4E+03 | |
| 1.25% | Bacteria | <10 | <10 | <10 | <10 | <10 | 0.5% PO* |
| (25% zemea, 22% PC, | Yeast | <10 | <10 | <10 | <10 | <10 | 0.125% CHA* |
| 40% PO, 10% CHA, 3% IPMP) | Mold | 1.0E+02 | <10 | <10 | <10 | <10 | 0.0375% IPMP* |
| No preservative | Bacteria | 8.1E+05 | 4.9E+05 | 7.3E+05 | >3.0E+06 | >3.0E+06 | |
| | Yeast | 5.4E+05 | 1.2E+04 | 8.7E+05 | 9.1E+05 | 8.0E+05 | |
| | Mold | 5.0E+04 | 5.7E+04 | 8.0E+04 | 9.0E+04 | 2.0E+05 | |

*Emulsions preserved with combination of PO and CHA, or PO, CHA and IPMP passed the PET.

While the compositions and methods of the disclosed and/or claimed inventive concept(s) have been described in terms of particular aspects, it will be apparent to those of ordinary skill in the art that variations may be applied to the compositions and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

What is claimed is:

1. A synergistic preservative composition for providing broad spectrum antimicrobial activity comprising:
   i. about 0.1 wt. % to about 99.9 wt. % of propylene carbonate;
   ii. about 0.1 wt. % to about 99.9 wt. % of one or more organic compounds selected from the group consisting of caprylhydroxamic acid and isopropyl methylphenol (IPMP); and
   iii. about 0.1 wt. % to 99.0 wt. % of phenoxy ethanol, a preservative compound, and wherein, the composition has a Synergy Index (SI) value of the total composition from about 0.05 to about 1.0.

2. The preservative composition according to claim 1, wherein said synergy increases the antimicrobial efficacy of the total composition and reduces the required antimicrobial use levels of said (a) one or more organic compounds and/or (b) phenoxy ethanol.

3. The preservative composition according to claim 1, wherein the inclusion of propylene carbonate to a said (a) one or more organic compound/s and/or (b) phenoxyethanol provides a composition that can demonstrate synergism.

4. The preservative composition according to claim 1, wherein said (a) one or more organic compounds and/or (b) preservative compounds are selected based on their Synergy Index ranging from about 0.10 to about 0.96 to provide synergy.

5. The preservative composition according to claim 1, further including a preservative or preservative system comprising at least one preservative compound selected from the group consisting of triclosan, 2-methyl-4-isothiazolin-3-one (MIT), 1,2-benzisothiazolin-3-one (BIT), 5-chloro-2-methyl-4-isothiazolin-3-one (CMIT), 2-octyl-4-isothiazolin-3-one (OIT), 3-iodo-2-propynylbutyl-carbamate (IPBC), 3-iodopropynyl-N-phenyl carbamate (IPPC), zinc pyrithione (ZnPy), bronopol, quaternary ammonium compounds, parabens, alkyl parabens, chlorophenisin, benzyl alcohol, organic acids, sorbic acid and their salts, benzoic acid and their salts, salicylic and their salts, potassium sorbate, sodium benzoate, phenoxyethanol, diazolidinyl urea, imidazolidinyl urea, sodium hydroxymethyl glycinate, hydantoins, sodium pyrithione, phenyl ethanol, phenyl propanol, benzalkonium quaternary ammonium compounds, fatty acids and their salts, a-hydroxy acids and their salts, beta acids and their salts, glycerols, hexyl glycerine, tropolones, sisquiterpenes, anisic acid and their salts, levulinic acid and their salts, dehydroacetic acids and their salts, biguinaide (PHMB) and ethyl hexyl glycerine.

6. The preservative composition according to claim 1, wherein said composition is used for inhibiting or killing yeasts, mold spores, gram (+), gram (−) bacterial strains, acne causing strains, odor causing strains, or mycoses causing strains.

7. The preservative composition according to claim 1, wherein said composition is used for inhibiting or killing microbial strains selected from the group consisting of *Candida tropicalis, Candida albicans, Hansenula anomala, Saccharomyces cerevisiae, Torulaspora delbreuckii, Zygosaccharomyces bailii, Zygosaccharomyces rouxii, Bacillus subtilis, Bacillus cereus, Staphylococcus aureus, Staphylococus epidermidis, Escherichia coli, Salmonella typhimurium, Salmonella enteritidis, Pseudomonas aeruginosa, Aspergillus niger, Aspergillus flavus, Penicillium islandicum, Penicillium citrinum, Penicillium chrysogenum, Fusarium oxysporum, Fusarium graminearum, Fusarium solani, Alternaria alternata, Aspergillus brasiliensis, Burkhodelia cepacia, Enterobacter aerogenes, Enterobacter cloacae, Enterobacter gergoviae, Klebsiella pneumoniae, Proteus vulgaris, Pseudomonas fluorescens, Pseudomonas putida, Penicillium pinophilum* and *Mucor racemosus*.

8. The preservative composition according to claim 1, wherein said composition is stable on storage for at least 2 years at room temperature.

9. The preservative composition according to claim 1, wherein said composition is formulated as an emulsion, microemulsion, nanoemulsion, solution, dispersion, suspension, complex coacervate(s), lamellar gel, liposome, niosome, or concentrate.

10. The preservative composition according to claim 1 employed in aqueous and non-aqueous based end-user applications comprising cosmetic products, toiletry products, personal care products, oral care products, skin care products, hair care products, household & cleaning products, soap and bath products, industrial and institutional cleaning products, disinfecting products, wound care, sanitary products, agricultural compositions, textile industries, coating industries or laundry products.

11. The preservative composition according to claim 1, wherein the amount of preservative composition employed in aqueous and non-aqueous based end-user products/compositions is in the range of from about 0.01 wt. % to about 5.0 wt. % of the total composition.

12. A process for preparing the synergistic preservative composition of claim 1, the process comprising the steps of: mixing (i) about 0.1 wt. % to about 99.9 wt. % of propylene carbonate; (ii) about 0.1 wt. % to about 99.9 wt. % of one or more organic compounds selected from the group consisting of caprylhydroxamic acid and isopropyl methylphenol (IPMP); and (iii) about 0.1 wt. % to 99.0 wt. % of phenoxy ethanol, a preservative compound to provide a homogenous solution.

13. A synergistic preservative composition for providing broad spectrum antimicrobial activity comprising:
   i. about 0.1 wt. % to about 99.9 wt. % of propylene carbonate;
   ii. about 0.1 wt. % to about 99.9 wt. % one or more organic compounds selected from the group consisting of caprylhydroxamic acid and isopropyl methylphenol; and
   iii. about 0.1 wt. % to 99.9 wt. % of phenoxy ethanol.

14. A cosmetic or personal care or house hold, cleaning, Industrial & Institutional product comprising the synergistic preservative composition of claim 1, and wherein, the amount of preservative composition is in the range of from about 0.01 wt. % to 5.0 wt. %, relative to the total mass of said products.

15. A method of killing bacteria, fungi, molds, yeasts and viruses or inhibiting their growth in cosmetic, personal care, house hold, cleaning, or Industrial & Institutional products susceptible to growth of microorganisms comprising incorporating into said aqueous and non-aqueous based end-user products ranging from about 0.01 wt. % to 5.0 wt. % of preservative composition of claim 1.

* * * * *